United States Patent
Fuoco et al.

(10) Patent No.: US 10,546,062 B2
(45) Date of Patent: Jan. 28, 2020

(54) PHONETIC PATTERNS FOR FUZZY MATCHING IN NATURAL LANGUAGE PROCESSING

(71) Applicant: International Business Machines Corporation, Armonk, NY (US)

(72) Inventors: Sean M. Fuoco, New York, NY (US); John M. Ganci, Jr., Cary, NC (US); Craig M. Trim, Sylmar, CA (US); Jie Zeng, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 15/813,416

(22) Filed: Nov. 15, 2017

(65) Prior Publication Data

US 2019/0147036 A1    May 16, 2019

(51) Int. Cl.
*G10L 15/00* (2013.01)
*G10L 15/26* (2006.01)
(Continued)

(52) U.S. Cl.
CPC ............ *G06F 17/277* (2013.01); *G10L 15/02* (2013.01); *G10L 25/33* (2013.01); *G10L 2015/027* (2013.01)

(58) Field of Classification Search
CPC ... G10L 15/02; G10L 15/08; G10L 2015/025; G10L 25/33; G10L 15/187; G10L 2015/027
See application file for complete search history.

(56) References Cited

U.S. PATENT DOCUMENTS 6,847,932 B1 * 1/2005 Ashimura ............... G10L 13/10
704/266
7,177,795 B1 * 2/2007 Chen ..................... G06F 16/685
704/9
(Continued)

FOREIGN PATENT DOCUMENTS

CN     104464736 A    3/2015
WO   2009017926 A2    2/2009

OTHER PUBLICATIONS

Jiannan Wang, et al., Fast-Join: An Efficient Method for Fuzzy Token Matching based String Similarity Join, 20 II IEEE 2711, International Conference on Data Engineering Dec. 31, 2011.
(Continued)

*Primary Examiner* — Olujimi A Adesanya
(74) *Attorney, Agent, or Firm* — Garg Law Firm, PLLC; Rakesh Garg; James Nock

(57) ABSTRACT

A token is extracted from a Natural Language input. A phonetic pattern is computed corresponding to the token, the phonetic pattern including a sound pattern that represents a part of the token when the token is spoken. New data is created from data of the phonetic pattern, the new data including a syllable sequence corresponding to the phonetic pattern. A state of a data storage device is changed by storing the new data in a matrix of syllable sequences corresponding to the token. An option is selected that corresponds to the token by executing a fuzzy matching algorithm using a processor and a memory, the selecting of the option is based on a syllable sequence in the matrix.

24 Claims, 6 Drawing Sheets

(51) Int. Cl.
  *G10L 17/00* (2013.01)
  *G06F 17/27* (2006.01)
  *G10L 15/02* (2006.01)
  *G10L 25/33* (2013.01)

(56) References Cited

U.S. PATENT DOCUMENTS

| | | | | |
|---|---|---|---|---|
| 8,521,539 | B1* | 8/2013 | Teng | G01C 21/3608 |
| | | | | 701/418 |
| 8,738,378 | B2* | 5/2014 | Harada | G10L 15/10 |
| | | | | 704/251 |
| 8,751,485 | B2* | 6/2014 | Yang | G06F 17/2863 |
| | | | | 707/722 |
| 9,164,983 | B2 | 10/2015 | Liu et al. | |
| 2002/0082831 | A1* | 6/2002 | Hwang | G10L 15/063 |
| | | | | 704/249 |
| 2003/0125945 | A1* | 7/2003 | Doyle | G10L 15/01 |
| | | | | 704/246 |
| 2003/0187649 | A1* | 10/2003 | Logan | G06F 16/685 |
| | | | | 704/260 |
| 2005/0182558 | A1* | 8/2005 | Maruta | G01C 21/30 |
| | | | | 701/532 |
| 2005/0228661 | A1* | 10/2005 | Prous Blancafort | G10L 15/02 |
| | | | | 704/230 |
| 2006/0064177 | A1* | 3/2006 | Tian | G10L 15/197 |
| | | | | 700/1 |
| 2007/0055525 | A1 | 3/2007 | Kennewick et al. | |
| 2009/0030894 | A1* | 1/2009 | Mamou | G06F 16/3343 |
| 2010/0217591 | A1 | 8/2010 | Shpigel | |
| 2012/0203776 | A1* | 8/2012 | Nissan | G06F 16/685 |
| | | | | 707/728 |
| 2012/0317098 | A1* | 12/2012 | Okato | G06F 16/31 |
| | | | | 707/722 |
| 2013/0006629 | A1* | 1/2013 | Honda | G10L 15/187 |
| | | | | 704/236 |
| 2013/0332164 | A1 | 12/2013 | Nalk | |
| 2014/0074476 | A1* | 3/2014 | Riccardi | G10L 15/02 |
| | | | | 704/254 |
| 2014/0222416 | A1* | 8/2014 | Huang | G06F 17/2223 |
| | | | | 704/9 |
| 2014/0280342 | A1 | 9/2014 | Litherland et al. | |
| 2015/0127347 | A1* | 5/2015 | Tjalve | G10L 15/19 |
| | | | | 704/257 |
| 2015/0302848 | A1* | 10/2015 | Kurata | G10L 15/187 |
| | | | | 704/254 |
| 2015/0340035 | A1 | 11/2015 | Serban et al. | |

OTHER PUBLICATIONS

PCT, International Searching Authority, PCT/IB2018/05821, dated Feb. 26, 2019.
Bitar, Nabil N., "Acoustic Analysis and Modeling of Speech Based on Phonetic Features," Dissertation, Boston University, 1998.
Nagy et al., "A Quantitative Categorization of Phonemic Dialect Features in Context," Context 2005, LNAI3554, pp. 326-338, 2005.

* cited by examiner

PHONETIC PATTERNS FOR FUZZY MATCHING IN NATURAL LANGUAGE PROCESSING

TECHNICAL FIELD

The present invention relates generally to a method, system, and computer program product for improving Natural Language Processing (NLP). More particularly, the present invention relates to a method, system, and computer program product for phonetic patterns for fuzzy matching in natural language processing.

BACKGROUND

A natural language (NL) is a scripted (written) or a vocalized (spoken) language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

An NL input is an input in constructed using a grammar of a natural language and presented in a suitable form, including but not limited to text, audio, and forms thereof, such as transcription from audio speech, machine-generated audio from text. A unit of an NL input is the shortest meaningful portion of the input. For example, in the English language, a unit would be a word; and words form other larger structures such as phrases, sentences, and paragraphs in the NL input. A unit of an NL input is also referred to herein as a token.

Presently algorithms are available to enable machines in understanding NL inputs. An essential part of understanding the NL input is repeatedly and reliably selecting the correct choice from the many likely machine-interpretations of an NL token. For example, a machine should be able to conclude that "tow-mah-tow" and "tuh-may-tow" are simply different ways of saying "tomato" and when "tow-mah-tow" is presented as an NL token, the correct selection or choice for that token is "tomato".

The illustrative embodiments recognize that machine-understanding of a token is sensitive to a number of factors. In some cases, an emphasis placed on a token or a portion thereof can cause an incorrect selection corresponding to the token. In some other cases, a dialect, an accent, a locality of the NL input affects the meaning of the token. Additionally, there can be multiple valid choices corresponding to a token but only one of them correct based on the factors involved.

The factors contemplated by the illustrative embodiments are related to the phonetic variations of a token as described herein. As such, the factors contemplated by the illustrative embodiments, which affect machine-understanding of NL tokens, are distinct from misspelling and typographical errors-type of reasons that affect correct token recognition. Presently, techniques exist to help an NLP machine to select the correct choice when misspelled tokens are encountered in textual NL inputs. Several misspelled tokens are mapped to the same correct word, e.g., misspellings such as "tirminate", "termate", and "termenate" are mapped to the correct selection—"terminate"- to assist the NLP machine to make the correct selection when a misspelled token is encountered.

Some presently used NLP algorithms build large caches of misspellings mapped to correct spellings. Such caches can be large, but they are still far from exhaustive. For example, just for the English language cache, a single eight-character word can theoretically have $26^8$ (208,827,064,576) possible variations. Some algorithms in this class of algorithms optimize the cache, e.g., by including only the most common misspellings. Still, the cache of mappings remains far from complete, is not scalable, and handles only a limited type of issues—the misspellings in textual inputs.

Fuzzy matching is another class of algorithms used to map an NL token to a choice or selection from a set of selections. A fuzzy matching algorithm (FUZZY MATCHING ALGORITHM) is a string matching algorithm that uses variations of edit distance algorithms as a means of finding similarities between a given token string from textual input and an available selection string in a set of selections. Fuzzy matching algorithms also operate on textual NL inputs, and are presently configured for correctly understanding misspelled character strings.

Presently, fuzzy matching algorithms are designed to have a high recall at the cost of sacrificing precision. Recall is a fraction of relevant instances that are retrieved, and precision is the fraction of retrieved instances that are relevant. Precision can be seen as a measure of exactness or quality, whereas recall is a measure of completeness or quantity. Maximum precision indicates no false positives, and maximum recall indicates no false negatives.

The illustrative embodiments recognize that factors other than misspellings in textual inputs are responsible for precision of understanding NL tokens. Such factors are dependent upon the tonal or phonetic characteristics of the token rather than the correctness or incorrectness of the textual spelling of the token.

The illustrative embodiments recognize that a method is needed by which the phonetic variations of tokens can be represented in NLP so that the fuzzy matching application increase in precision while keeping the recall characteristic unchanged when making selections corresponding to NL inputs. The illustrative embodiments recognize that the presently available fuzzy matching algorithms have to be modified to be able to use phonetic characteristics of tokens as additional inputs in determining the correct selection corresponding to the token.

SUMMARY

The illustrative embodiments provide a method, system, and computer program product. An embodiment includes a method that extracts a token from a Natural Language (NL) input. The embodiment computes a phonetic pattern corresponding to the token, the phonetic pattern comprising a sound pattern that represents a part of the token when the token is spoken. The embodiment creates new data from data of the phonetic pattern, the new data comprising a syllable sequence corresponding to the phonetic pattern. The embodiment changes a state of a data storage device by storing the new data in a matrix of syllable sequences corresponding to the token. The embodiment selects, by executing a fuzzy matching algorithm using a processor and a memory, an option that corresponds to the token, wherein the selecting is based on a syllable sequence in the matrix. Thus, the embodiment causes an improvement in the precision of the fuzzy matching algorithm by selecting a matching option for the NL token where the option is selected because the option also corresponds to a syllable sequence representative of the token.

Another embodiment further computes a second syllable sequence corresponding to the phonetic pattern. The embodiment saves the second syllable sequence in the matrix. Thus, the embodiment enables configuring a plurality of syllable sequences that is representative of the token.

Another embodiment further determines whether a stored phonetic pattern in a phonetic repository corresponds to the token. The embodiment selects, responsive to the stored phonetic pattern corresponding to the token, the stored phonetic pattern as the phonetic pattern. Thus, the embodiment uses a historically learned phonetic pattern from a previous occurrence of the token.

Another embodiment further modifies, to form the phonetic pattern, a stored phonetic pattern corresponding to a second token in a phonetic repository, wherein the second token is comparable to the token by having a greater than a threshold degree of structural similarity with the token. Thus, the embodiment uses a phonetic pattern of a comparable but different token to construct a phonetic pattern of the token.

In another embodiment, the structural similarity exists because at least a threshold degree of similarity exists between a spelling of the token and a spelling of the second token. Thus, the embodiment provides one manner of selecting the comparable token.

In another embodiment, the structural similarity exists because at least a threshold degree of similarity exists between a length of a spelling of the token and a length of a spelling of the second token. Thus, the embodiment provides another manner of selecting the comparable token.

In another embodiment, the structural similarity exists because at least a threshold degree of similarity exists between a sequence of vowels in the token and a sequence of vowels in the second token. Thus, the embodiment provides another manner of selecting the comparable token. Thus, the embodiment provides another manner of selecting the comparable token.

In another embodiment, the sound pattern comprises a phonetic representation, wherein the structural similarity exists because at least a threshold degree of similarity exists between a number of phonetic representations in the token and a number of phonetic representations in the second token. Thus, the embodiment provides another manner of selecting the comparable token.

In another embodiment, the sound pattern comprises a phonetic representation, wherein the structural similarity exists because at least a threshold degree of similarity exists between an order of phonetic representations in the token and an order of phonetic representations in the second token. Thus, the embodiment provides another manner of selecting the comparable token.

In another embodiment, the sound pattern comprises a phonetic representation, wherein the structural similarity exists because at least a threshold degree of similarity exists between an emphasis on the phonetic representation in the token and an emphasis on the phonetic representation in the second token. Thus, the embodiment provides another manner of selecting the comparable token.

Another embodiment further computes the phonetic pattern from a second phonetic pattern by adding a second sound pattern to the second phonetic pattern. Thus, the embodiment provides a manner of modifying the phonetic pattern of the comparable token to create the phonetic pattern of the token.

Another embodiment further computes the phonetic pattern from a second phonetic pattern by removing a second sound pattern from the second phonetic pattern. Thus, the embodiment provides another manner of modifying the phonetic pattern of the comparable token to create the phonetic pattern of the token.

Another embodiment further computes the phonetic pattern from a second phonetic pattern by replacing a second sound pattern in the second phonetic pattern with the sound pattern. Thus, the embodiment provides another manner of modifying the phonetic pattern of the comparable token to create the phonetic pattern of the token.

Another embodiment further computes the phonetic pattern from a second phonetic pattern by changing a sequence of sound patterns in the second phonetic pattern. Thus, the embodiment provides another manner of modifying the phonetic pattern of the comparable token to create the phonetic pattern of the token.

Another embodiment further computes the phonetic pattern from a second phonetic pattern by changing a duration of a second sound pattern in the second phonetic pattern. Thus, the embodiment provides another manner of modifying the phonetic pattern of the comparable token to create the phonetic pattern of the token.

Another embodiment further computes the phonetic pattern from a second phonetic pattern by changing an emphasis on a second sound pattern in the second phonetic pattern. Thus, the embodiment provides another manner of modifying the phonetic pattern of the comparable token to create the phonetic pattern of the token.

Another embodiment further computes a set of phonetic patterns corresponding to the token, the phonetic pattern being a member of the set of phonetic patterns. Thus, the embodiment provides that a plurality of phonetic patterns can represent the token.

In another embodiment, the sound pattern represents the part of the token when the token is spoken in a dialect of a language. Thus, the embodiment provides that a plurality of phonetic patterns can represent the token such that a phonetic pattern is based on sound patterns created by speaking in a dialect.

In another embodiment, the sound pattern represents the part of the token when the token is spoken with an accent in a language. Thus, the embodiment provides that a plurality of phonetic patterns can represent the token such that a phonetic pattern is based on sound patterns created by speaking with an accent.

In another embodiment, the sound pattern represents the part of the token when the token is spoken in a language with a speech-peculiarity of a speaker. Thus, the embodiment provides that a plurality of phonetic patterns can represent the token such that a phonetic pattern is based on sound patterns created by a speaker's speaking-related idiosyncrasies.

In another embodiment, the token comprises a shortest meaningful unit of speech in the NL input. Thus, the embodiment provides a specific type of linguistic construct that can form a token.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
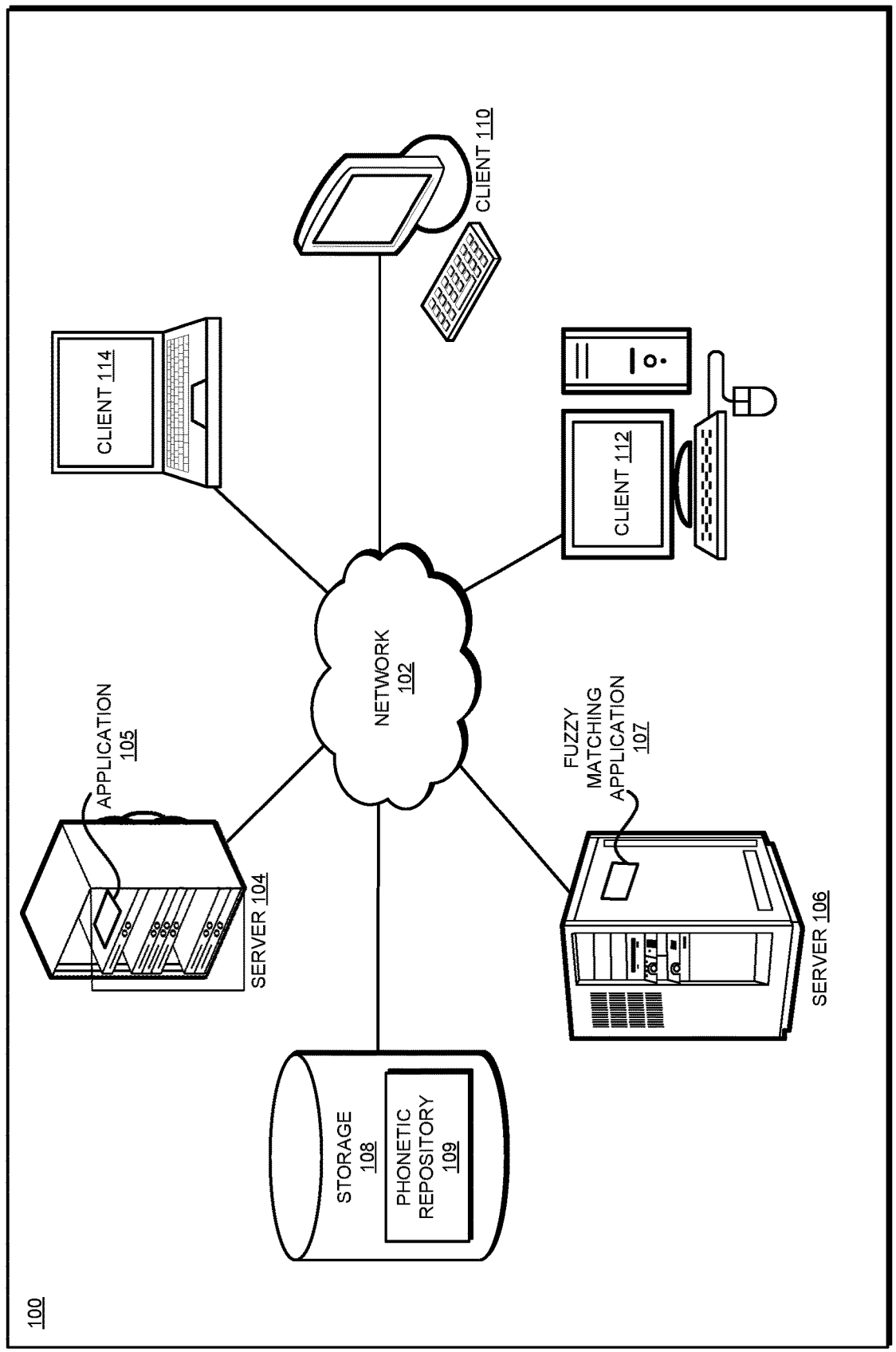
FIG. 1 depicts a block diagram of a network of data processing systems in which illustrative embodiments may be implemented.

The illustrative embodiments recognize that the presently available tools or solutions do not address these needs/problems or provide adequate solutions for these needs/problems. The illustrative embodiments used to describe the invention generally address and solve the above-described problems and other related problems by phonetic patterns for fuzzy matching in natural language processing.

An embodiment can be implemented as a software application. The application implementing an embodiment, or one or more components thereof, can be configured as a modification of an existing application implementing an fuzzy matching algorithm (fuzzy matching application)—i.e., a native application in the fuzzy matching application, as an application executing in a data processing system communicating with an existing fuzzy matching application over a short-range radio network such as Bluetooth, over a wired or wireline local area network (LAN)—i.e., a local application on the LAN, as an application executing in a data processing system communicating with an existing fuzzy matching application over a wide area network (WAN)—i.e., a remote application on the WAN, as a separate application that operates in conjunction with an existing fuzzy matching application in other ways, a standalone application, or some combination thereof.

Within the scope of the illustrative embodiments, a phonetic representation is a sound pattern that represents all or a part of a NL token when the token is spoken. A syllable is phonological building block, to wit, a sound used in a speech in a given language that can be represented using one or more vowels of that language.

In accordance with an illustrative embodiment, a token is extracted from an NL input. The embodiment determines one or more distinct phonetic representations (distinct phonetic sounds) that together from a phonetic pattern, and the phonetic pattern represents the token. For example, one manner of representing an example token—"tomato"—is where "tow" "mah" and "tow" form a set of three phonetic representations that together form the phonetic pattern "tow-mah-tow", which represents token "tomato". Another example manner of representing the example token—"tomato"—is where "tuh" "may" and "tow" form a different set of three phonetic representations that together form a second phonetic pattern "tuh-may-tow", which also represents token "tomato".

In other words, given a token, the embodiment constructs one or more phonetic patterns using corresponding sets of phonetic representations, such that any of the phonetic patterns can possibly represent the given token.

An embodiment stores a phonetic pattern of a token in a repository—the phonetic repository. Over time, upon encountering several tokens and several instances of the same token under different circumstances, the phonetic repository becomes populated with one or more phonetic patterns corresponding to one or more tokens.

In one embodiment, given a token, a set of phonetic patterns corresponding to the token are available in the phonetic repository. When a phonetic pattern of the token is available is the repository, the phonetic pattern is extracted into the set of phonetic patterns for that token.

In another embodiment, a phonetic pattern of a different token, which is comparable or similar to the given token in its phonetic structure, may be available in the repository. An embodiment computes a phonetic pattern of the token from the phonetic pattern of the comparable token.

For example, a phonetic pattern for tomato may not be available but a phonetic pattern for "potato" might be available in the repository. An embodiment determines the structural similarity between a given token and a comparable token by comparing for the two tokens the spelling, the length of the spelling, arrangement of the vowels therein, the number of phonetic representations therein, the order of phonetic representations therein, the emphasis on a particular phonetic representation, or some combination of these and other such characteristics. When the structural similarities between the given token and a comparable token exceeds a threshold level of similarity, the embodiment uses the phonetic pattern of the comparable token from the repository and computes a phonetic pattern of the given token from that phonetic pattern.

In an embodiment, the computing of the phonetic pattern of the given token can include adding a phonetic representation to the phonetic pattern of the comparable token, deleting a phonetic representation from the phonetic pattern of the comparable token, replacing a phonetic representation in the phonetic pattern of the comparable token with a different phonetic representation, changing a sequence of phonetic representations in the phonetic pattern of the comparable token, compressing a duration during which the phonetic pattern of the comparable token is spoken or sounded out, expanding a duration during which the phonetic pattern of the comparable token is spoken or sounded out, adding an emphasis to a phonetic representation in the phonetic pattern of the comparable token, removing an emphasis from a phonetic representation in the phonetic pattern of the comparable token, changing an emphasis from one phonetic representation to a different phonetic representation in the phonetic pattern of the comparable token, and a combination of these and many other aspects depending upon the language, dialect, accent, context, speaker's peculiarities, etc.

Regardless of the form in which the NL input is provided—e.g., textual, audio, or other forms described herein, an embodiment can construct a set of phonetic patterns corresponding to a token using phonetic patterns for the token from the repository and phonetic patterns of comparable tokens from the repositories. When the token is extracted from an NL input that is in audio form, a phonetic pattern for a token can also be constructed by segmenting the audio of the token into constituent phonetic representations.

Once a phonetic pattern is available for a token, an embodiment computes a syllable corresponding to each phonetic representation in the phonetic pattern. Thus, the embodiment transforms a phonetic pattern into a sequence of syllables. The transformation of a phonetic representation into a syllable can be performed by matching a sound present in the phonetic representation with a sound made by sounding out a syllable. For example, the phonetic pattern "tow-mah-tow" includes the sequence of sounds "oh" ( ɒ ), "ah" ( ɑ: ), and "oh" ( ɒ ). Thus, the sequence of syllables corresponding to the phonetic pattern of the token is " ɒ ɑ: ɒ ".

Operating in this manner, the embodiment constructs a syllable sequence for each phonetic pattern corresponding to the token. More than one syllable sequences may be possible for a single phonetic pattern. The set of syllable sequence thus created forms a matrix of syllable sequences.

An embodiment modifies an existing fuzzy matching application to accept the matrix of syllable sequences as a supporting input together with the NL input. The modified fuzzy matching application uses a syllable sequence in the matrix in the fuzzy matching algorithm to identify a suitable selection corresponding to a token. The selections identified using the syllable sequences exhibit a higher precision than the selections identified using only the prior-art fuzzy matching algorithm without using the syllable sequences.

The manner of phonetic patterns for fuzzy matching in natural language processing described herein is unavailable in the presently available methods. A method of an embodiment described herein, when implemented to execute on a device or data processing system, comprises substantial advancement of the functionality of that device or data processing system in improving a precision of a fuzzy matching application without disturbing the fuzzy matching application's recall characteristics in the technical field of NLP.

The illustrative embodiments are described with respect to certain types of NL, NL inputs, grammars, tokens, phonetic representations, phonetic patterns, syllables, syllable sequences, matrices, fuzzy matching algorithms, fuzzy matching applications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
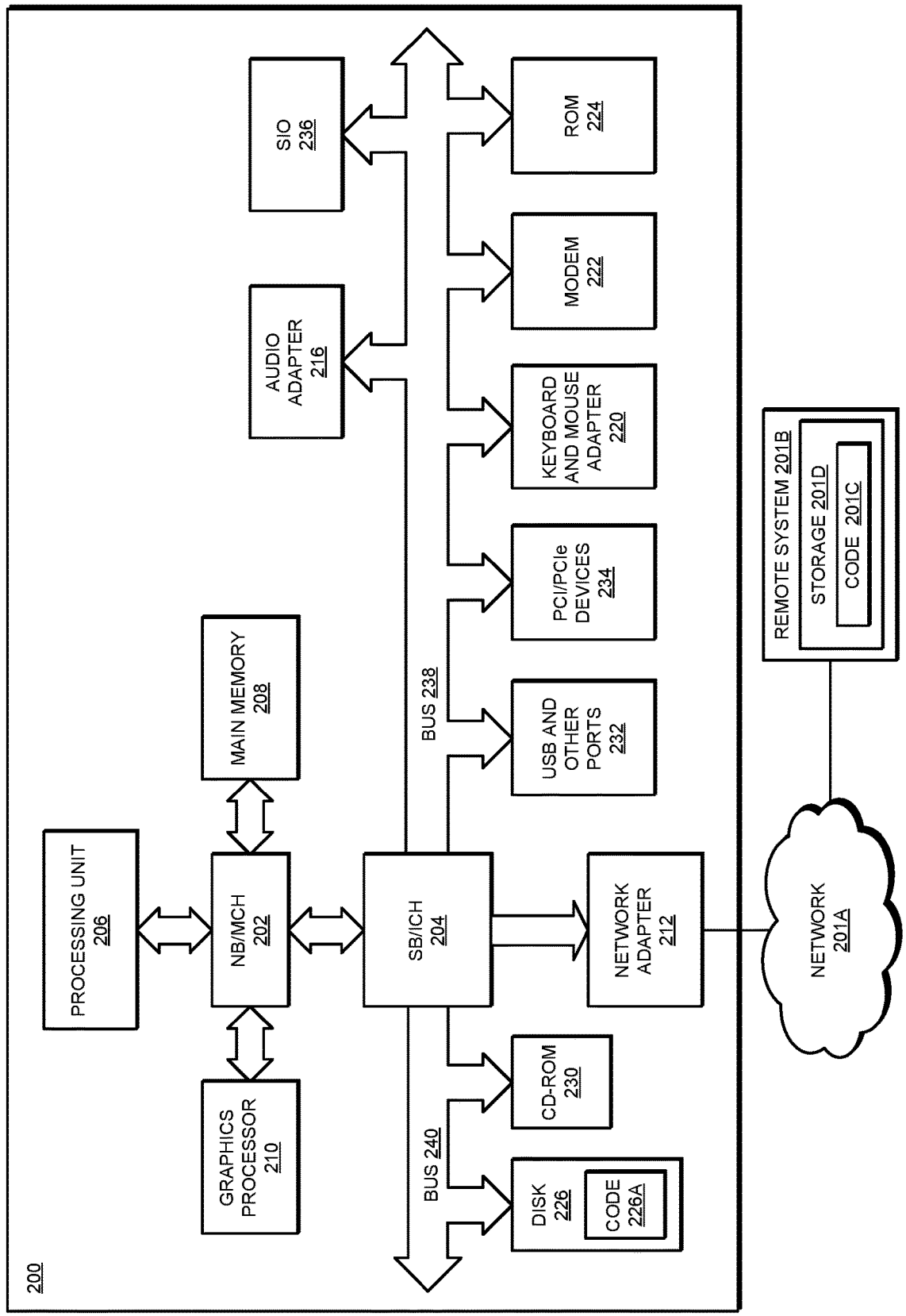
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. fuzzy matching application 107 is a modified fuzzy matching application which includes a modified fuzzy matching algorithm where the modified fuzzy matching algorithm has been modified to accept a matrix of syllable sequences as an additional input for identifying a correct selection corresponding to a token in an NL input. Phonetic repository 109 includes one or more phonetic patterns for one or more tokens in one or more languages, as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or modified fuzzy matching application 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
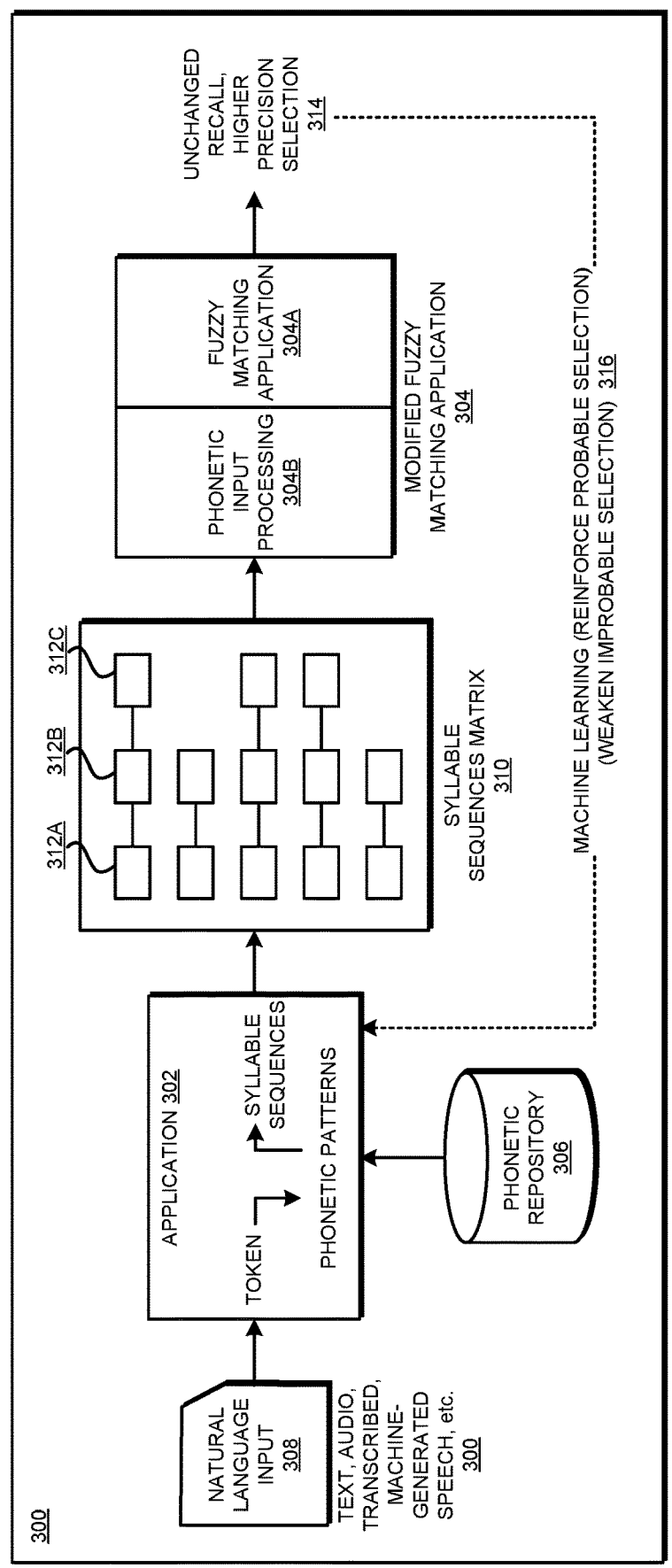
FIG. 3 depicts a block diagram of an example configuration for phonetic patterns for fuzzy matching in natural language processing in accordance with an illustrative embodiment.

With reference to FIG. 3, this figure depicts a block diagram of an example configuration for phonetic patterns for fuzzy matching in natural language processing in accordance with an illustrative embodiment. Application 302 is an example of application 105 in FIG. 1. Fuzzy matching application 304 is an example of modified fuzzy matching application 107 in FIG. 1. Fuzzy matching application 304 comprises prior-art fuzzy matching algorithm 304A and phonetic input processing component 304B according to an embodiment. Phonetic repository 306 is an example of phonetic repository 109 in FIG. 1.

NL input 308 comprises one or more forms of NL data as described herein. NL input 308 includes one or more tokens, e.g., words.

Application 302 suitably parses NL input 308 to extract a token from NL input 308. Using one or more phonetic patterns from phonetic repository 306 and/or audio data from NL input 308 if available, application 302 constructs one or more phonetic patterns corresponding to the token. Application 302 computes one or more syllable sequences corresponding to each phonetic pattern and forms syllable sequence matrix 310. A syllable sequence, e.g., syllable sequence 312 in matrix 310 comprises a sequence of one or more syllables, such as syllables 312A, 312B . . . 312C.

Phonetic input processing component 304B receives NL input 308 as one input, and matrix 310 from application 302 as an additional input. Component 304B causes fuzzy matching algorithm 304A to use the syllable sequences in the selection/choice identification process corresponding to a given token. Fuzzy matching application 304 outputs selection 314 with a greater precision and at least the same recall as compared to a selection that would have been output from fuzzy matching algorithm 304A alone.

In one embodiment, the selection output of modified fuzzy matching application 304 is used to train application 302. For example, if a separate process (not shown) determines that selection 314 is a probable selection for a given token, machine learning feedback 316 causes application 302 to increase or reinforce those phonetic patterns that correspond to selection 314 within a threshold degree of correspondence such that those phonetic patterns are produced again (or given comparatively more weight) for the same or similar token in a subsequent occurrence of the token. If a phonetic pattern was constructed that does not correspond to selection 314 within a threshold degree of correspondence, feedback 316 causes application 302 to decrease or weaken those phonetic patterns such that those phonetic patterns are not produced (or given comparatively less weight) for the same or similar token in a subsequent occurrence of the token.

Figure 4:
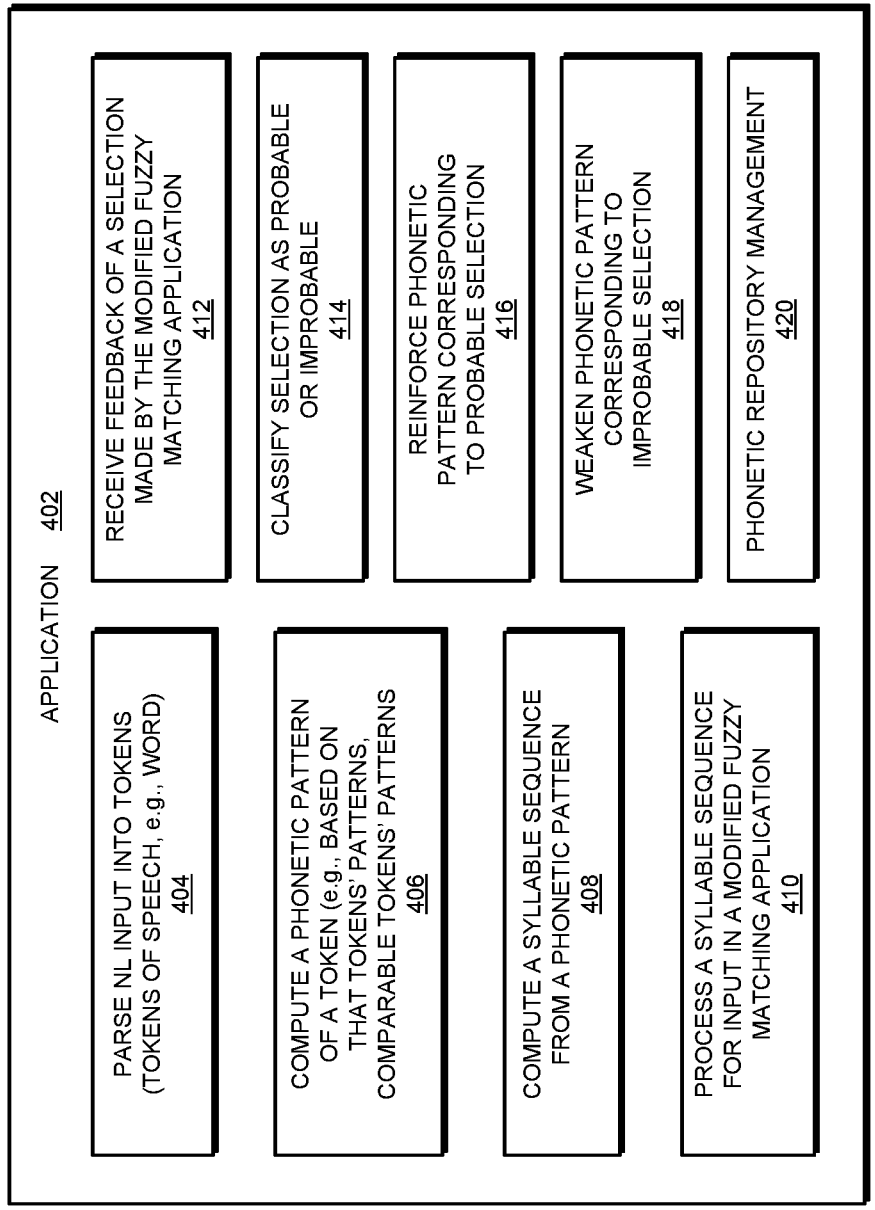
FIG. 4 depicts a block diagram of an example application for phonetic patterns for fuzzy matching in natural language processing in accordance with an illustrative embodiment.

With reference to FIG. 4, this figure depicts a block diagram of an example application for phonetic patterns for fuzzy matching in natural language processing in accordance with an illustrative embodiment. Application 402 can be used as application 302 in FIG. 3.

Component 404 extracts a token from an NL input, e.g., by parsing NL input 308 according to a grammar of the language of input 308. Component 406 computes a phonetic pattern for the token in any one or more manners described herein.

Component 408 computes a syllable sequence corresponding to a phonetic pattern. component 408 outputs a matrix of syllable sequences, e.g., matrix 310, corresponding to the token.

Component 410 may be configured to operate as phonetic input processing component 304B in FIG. 3. Component 410 processes the matrix of syllable sequences to use in the modified fuzzy matching application, e.g., in fuzzy matching application 304.

Component 412 receives a feedback of the selection made by the modified fuzzy matching application, e.g., feedback 316. Component 414 implements a suitable process for classifying the selection as probable (valid selection in the context of NL input 308) or improbable (invalid selection in the context of NL input 308).

Component 416 reinforces those phonetic patterns of the token which correspond to a probable selection. Component 418 weakens those phonetic patterns of the token which correspond to an improbable selection. Component 420 manages the phonetic repository, e.g., by adding a new phonetic pattern, reinforcing a phonetic pattern, weakening a phonetic pattern, removing a phonetic pattern, or otherwise manipulating phonetic patterns in the repository.

Figure 5:
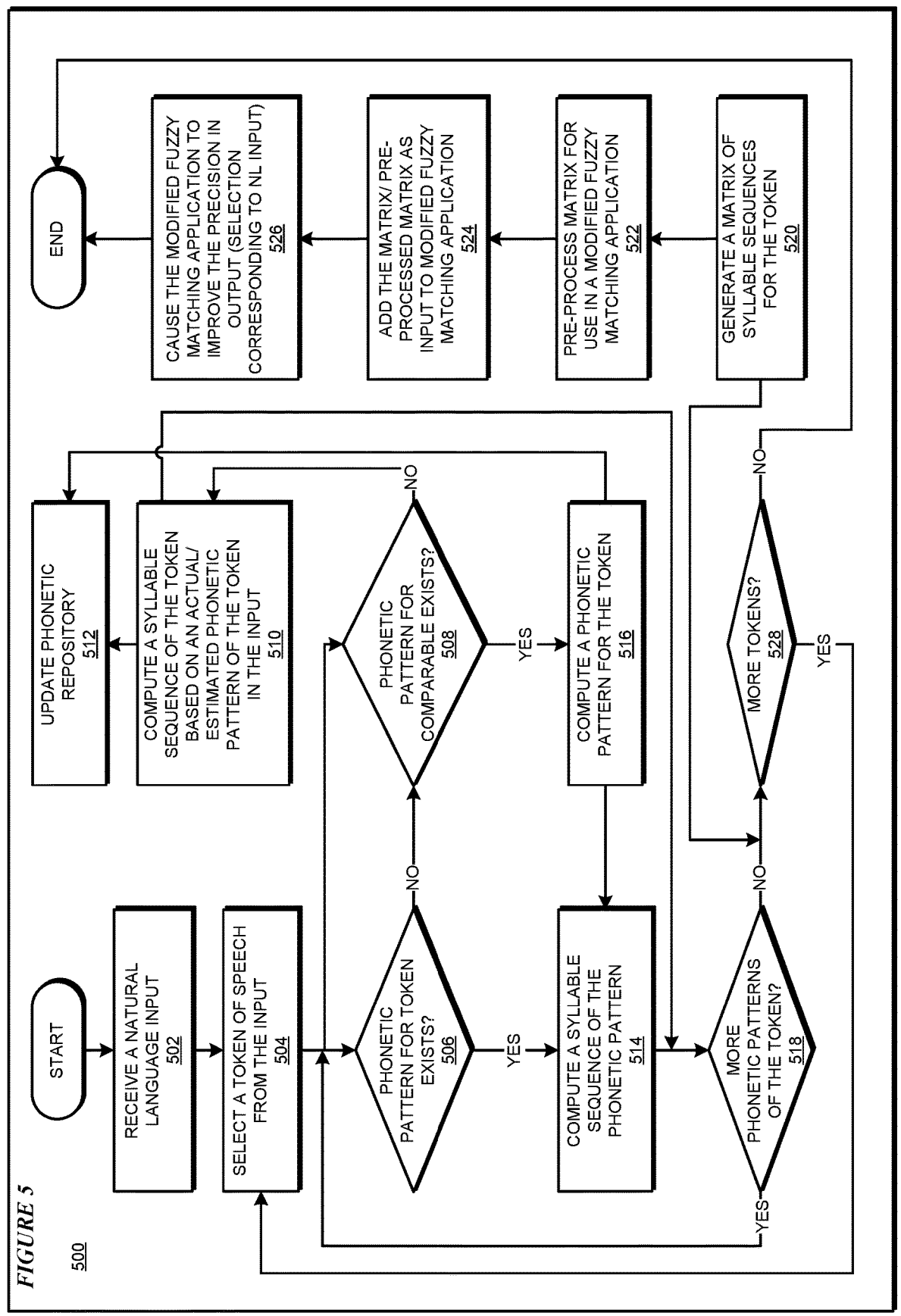
FIG. 5 depicts a flowchart of an example process for phonetic patterns for fuzzy matching in natural language processing in accordance with an illustrative embodiment.

With reference to FIG. 5, this figure depicts a flowchart of an example process for phonetic patterns for fuzzy matching in natural language processing in accordance with an illustrative embodiment. Process 500 can be implemented in application 402 in FIG. 4.

The application receives an NL input (block 502). The application selects a unit of speech, to wit, a token, from the input (block 504). For the selected token, the application performs one or more of blocks 506, 508, and 510. For example, the application determines whether a phonetic pattern for the token exists in a phonetic repository (block 506); the application determines whether a phonetic pattern of a comparable token exists in the repository (block 508); and/or the application computes a phonetic pattern of the token based on the actual or estimated audio of the token in the NL input (block 510). If/when the application executes block 510 to compute a phonetic pattern of the token based on the actual or estimated audio of the token in the NL input, the application updates the phonetic repository with the computed phonetic pattern (block 512).

If a phonetic pattern of the token exists in the repository ("Yes" path of block 506), the application computes one or more syllable sequences corresponding to the phonetic pattern (block 514). If a phonetic pattern of the token does not exist in the repository ("No" path of block 506), the application proceeds to block 508.

If a phonetic pattern of a comparable token exists in the repository ("Yes" path of block 508), the application computes a phonetic pattern of the token based on the phonetic pattern of the comparable token (block 516). The application updates the repository with the computed phonetic pattern for the token at block 512.

The application determines whether more phonetic patterns of the token have to be computed in a similar manner (block 518). If more phonetic patterns of the token have to be computed ("Yes" path of block 518), the application returns to any of blocks 506, 508, and 510. If no more phonetic patterns have to be computed for the token ("No" path of block 518), the application generates a matrix of the computed syllable sequences (block 520). Optionally, the application may preprocess the matrix for consumption as an additional input into a modified fuzzy matching application (block 522).

The application provides the matrix as an additional input to the modified fuzzy matching application (block 524). The application causes the modified fuzzy matching application to output a selection corresponding to the token with an improved precision (block 526). The application may end process 500 thereafter.

If no more phonetic patterns have to be computed for the token ("No" path of block 518), the application may also determine in parallel whether more tokens have to be processed from the NL input (block 528). If more tokens have to be processed from the NL input ("Yes" path of block 528), the application returns to block 504 and selects another token. If no more tokens have to be processed from the NL input ("No" path of block 528), the application ends process 500 thereafter.

Figure 6:
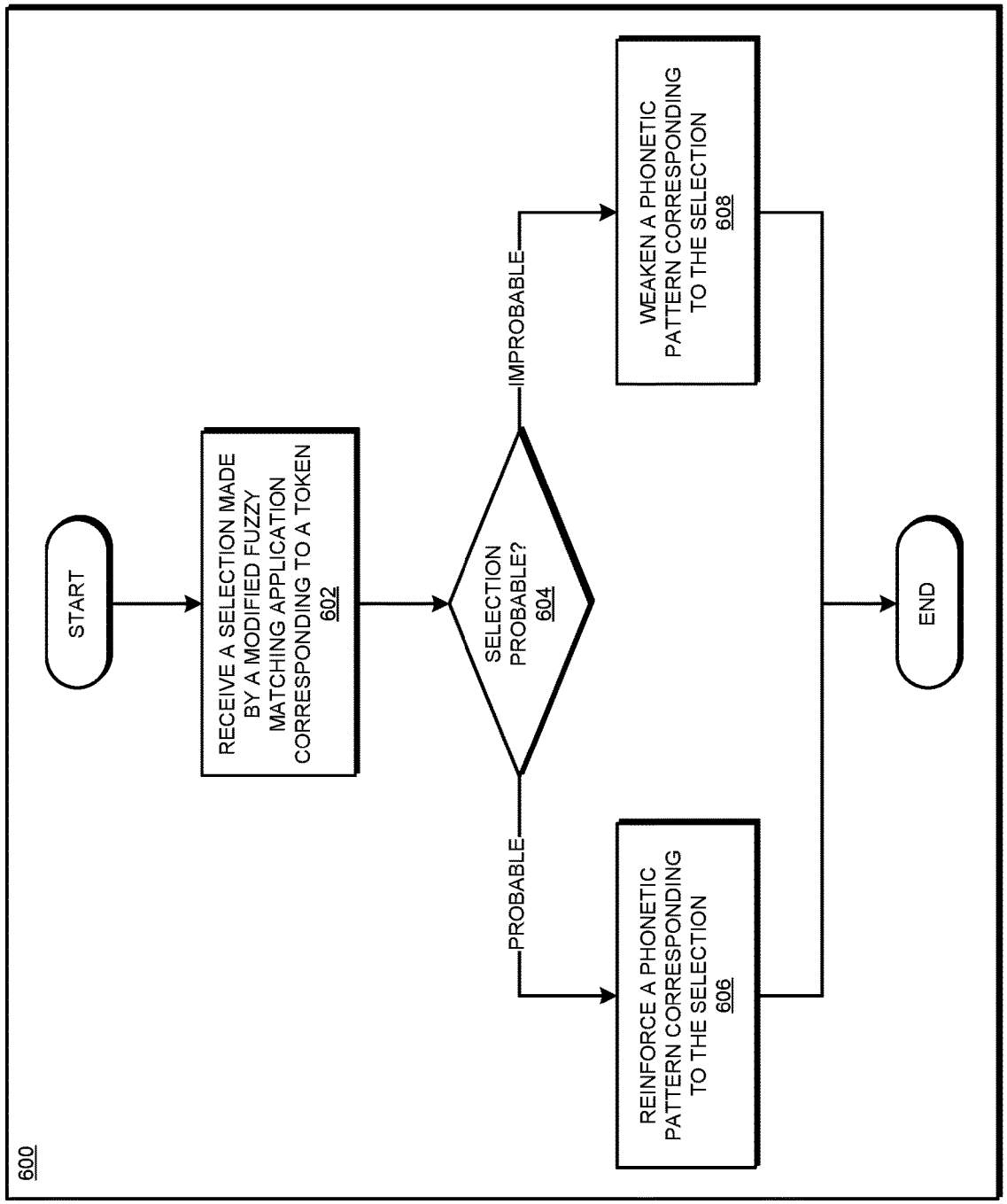
FIG. 6 depicts a flowchart of an example process for machine learning to improve phonetic pattern selection for NL tokens in accordance with an illustrative embodiment.

With reference to FIG. 6, this figure depicts a flowchart of an example process for machine learning to improve phonetic pattern selection for NL tokens in accordance with an illustrative embodiment. Process 600 can be implemented in application 402 in FIG. 4.

The application receives a selection made by a modified fuzzy matching application corresponding to a token (block 602). The application determines whether, given the NL input context, the selection is probable (block 604). If the selection is probable ("Probable" path of block 604), the application reinforces those phonetic patterns of the token which correspond to the selection (block 606). The application ends process 600 thereafter.

If the selection is improbable ("Improbable" path of block 604), the application weakens those phonetic patterns of the token which correspond to the selection (block 608). The application ends process 600 thereafter.

Thus, a computer implemented method, system or apparatus, and computer program product are provided in the illustrative embodiments for phonetic patterns for fuzzy matching in natural language processing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    extracting a token from a Natural Language (NL) input;
    computing a phonetic pattern corresponding to the token, the phonetic pattern comprising a sound pattern that represents a part of the token when the token is spoken;
    creating new data from data of the phonetic pattern, the new data comprising a syllable sequence corresponding to the phonetic pattern;

changing a state of a data storage device by storing the new data in a matrix of syllable sequences corresponding to the token;

selecting, by executing a fuzzy matching algorithm using a processor and a memory, an option that corresponds to the token, wherein the selecting is based on a syllable sequence in the matrix; and modifying, to form the phonetic pattern, a stored phonetic pattern corresponding to a second token in a phonetic repository, wherein the second token is comparable to the token by having a greater than a threshold degree of structural similarity with the token.

2. The method of claim 1, further comprising:
computing a second syllable sequence corresponding to the phonetic pattern; and
saving the second syllable sequence in the matrix.

3. The method of claim 1, further comprising:
determining whether a stored phonetic pattern in a phonetic repository corresponds to the token;
selecting, responsive to the stored phonetic pattern corresponding to the token, the stored phonetic pattern as the phonetic pattern.

4. The method of claim 1, wherein the structural similarity exists because at least a threshold degree of similarity exists between a spelling of the token and a spelling of the second token.

5. The method of claim 1, wherein the structural similarity exists because at least a threshold degree of similarity exists between a length of a spelling of the token and a length of a spelling of the second token.

6. The method of claim 1, wherein the structural similarity exists because at least a threshold degree of similarity exists between a sequence of vowels in the token and a sequence of vowels in the second token.

7. The method of claim 1, wherein the sound pattern comprises a phonetic representation, wherein the structural similarity exists because at least a threshold degree of similarity exists between a number of phonetic representations in the token and a number of phonetic representations in the second token.

8. The method of claim 1, wherein the sound pattern comprises a phonetic representation, wherein the structural similarity exists because at least a threshold degree of similarity exists between an order of phonetic representations in the token and an order of phonetic representations in the second token.

9. The method of claim 1, wherein the sound pattern comprises a phonetic representation, wherein the structural similarity exists because at least a threshold degree of similarity exists between an emphasis on the phonetic representation in the token and an emphasis on the phonetic representation in the second token.

10. The method of claim 1, further comprising:
computing the phonetic pattern from a second phonetic pattern by adding a second sound pattern to the second phonetic pattern.

11. The method of claim 1, further comprising:
computing the phonetic pattern from a second phonetic pattern by removing a second sound pattern from the second phonetic pattern.

12. The method of claim 1, further comprising:
computing the phonetic pattern from a second phonetic pattern by replacing a second sound pattern in the second phonetic pattern with the sound pattern.

13. The method of claim 1, further comprising:
computing the phonetic pattern from a second phonetic pattern by changing a sequence of sound patterns in the second phonetic pattern.

14. The method of claim 1, further comprising:
computing the phonetic pattern from a second phonetic pattern by changing a duration of a second sound pattern in the second phonetic pattern.

15. The method of claim 1, further comprising:
computing the phonetic pattern from a second phonetic pattern by changing an emphasis on a second sound pattern in the second phonetic pattern.

16. The method of claim 1, further comprising:
computing a set of phonetic patterns corresponding to the token, the phonetic pattern being a member of the set of phonetic patterns.

17. The method of claim 1, wherein the sound pattern represents the part of the token when the token is spoken in a dialect of a language.

18. The method of claim 1, wherein the sound pattern represents the part of the token when the token is spoken with an accent in a language.

19. The method of claim 1, wherein the sound pattern represents the part of the token when the token is spoken in a language with a speech-peculiarity of a speaker.

20. The method of claim 1, wherein the token comprises a shortest meaningful unit of speech in the NL input.

21. A computer usable program product comprising a computer-readable storage device, and program instructions stored on the storage device, the stored program instructions comprising:
program instructions to extract a token from a Natural Language (NL) input;
program instructions to compute a phonetic pattern corresponding to the token, the phonetic pattern comprising a sound pattern that represents a part of the token when the token is spoken;
program instructions to create new data from data of the phonetic pattern, the new data comprising a syllable sequence corresponding to the phonetic pattern;
program instructions to change a state of a data storage device by storing the new data in a matrix of syllable sequences corresponding to the token;
program instructions to select, by executing a fuzzy matching algorithm using a processor and a memory, an option that corresponds to the token, wherein the selecting is based on a syllable sequence in the matrix; and
program instructions to modify, to form the phonetic pattern, a stored phonetic pattern corresponding to a second token in a phonetic repository, wherein the second token is comparable to the token by having a greater than a threshold degree of structural similarity with the token.

22. The computer usable program product of claim 21, wherein the stored program instructions are stored in a computer readable storage device in a data processing system, and wherein the stored program instructions are transferred over a network from a remote data processing system.

23. The computer usable program product of claim 21, wherein the stored program instructions are stored in a computer readable storage device in a server data processing system, and wherein the stored program instructions are downloaded over a network to a remote data processing system for use in a computer readable storage device associated with the remote data processing system.

24. A computer system comprising a processor, a computer-readable memory, and a computer-readable storage device, and program instructions stored on the storage device for execution by the processor via the memory, the stored program instructions comprising:

program instructions to extract a token from a Natural Language (NL) input;

program instructions to compute a phonetic pattern corresponding to the token, the phonetic pattern comprising a sound pattern that represents a part of the token when the token is spoken;

program instructions to create new data from data of the phonetic pattern, the new data comprising a syllable sequence corresponding to the phonetic pattern;

program instructions to change a state of a data storage device by storing the new data in a matrix of syllable sequences corresponding to the token;

program instructions to select, by executing a fuzzy matching algorithm using a processor and a memory, an option that corresponds to the token, wherein the selecting is based on a syllable sequence in the matrix; and program instructions to modify, to form the phonetic pattern, a stored phonetic pattern corresponding to a second token in a phonetic repository, wherein the second token is comparable to the token by having a greater than a threshold degree of structural similarity with the token.

\* \* \* \* \*